United States Patent [19]
Miller

BEST AVAILABLE COPY

[11] 3,944,183
[45] Mar. 16, 1976

[54] CHANNELING WEDGE
[75] Inventor: James R. Miller, Oakdale Township, Washington County, Minn.
[73] Assignee: Minnesota Mining and Manufacturing Company, St. Paul, Minn.
[22] Filed: Apr. 7, 1975
[21] Appl. No.: 565,401

Related U.S. Application Data
[63] Continuation of Ser. No. 388,402, Aug. 15, 1973, abandoned.

[52] U.S. Cl. ............... 254/104; 156/48; 174/23 R; 264/272
[51] Int. Cl.² ............................. H02G 15/20
[58] Field of Search .......... 254/104; 174/23 R, 135; 156/48; 7/1 M; 264/272; 222/567, 575, 566, 462

[56] References Cited
UNITED STATES PATENTS
1,032,316  7/1912  Walters .............................. 254/104
3,081,977  3/1963  Weisgerber ................ 254/134.3 FT
3,185,442  5/1965  Hemphill ........................... 254/104
3,269,706  8/1966  Walker ............................... 254/104
3,290,194  12/1966  Gillemot ......................... 174/23 R FOREIGN PATENTS OR APPLICATIONS
26,604  11/1910  United Kingdom ................ 254/104

Primary Examiner—Harold D. Whitehead
Assistant Examiner—Robert C. Watson
Attorney, Agent, or Firm—Alexander, Sell, Steldt & DeLaHunt

[57]  ABSTRACT

A channeling wedge to be used for separating wires in a cable bundle and for separating the shield from the sheath to form passages affording resin or compound to more freely flow into the cable bundle and between the shield and the sheath and block the cable.

3 Claims, 6 Drawing Figures

CHANNELING WEDGE

This is a continuation of application Ser. No. 388,402 filed Aug. 15, 1973, now abandoned.

BACKGROUND OF THE INVENTION

This invention relates to an improvement in a member for separating wires in a cable bundle when the cable has been opened to form a gas-tight block in the cable on both sides of the area where work is to be performed on the cable. Multiconductor sheath cables, such as telephone or other communications cables, are often protected against moisture-penetration over critical parts of their length by maintaining dry air or another gas under pressure inside of the cable. If a leak develops in the outside sheath of the conductor the pressure of the gas escaping prevents moisture from entering the cable, and in addition, the regular monitoring of the pressure along the cable permits location of a leak, since a reduction in pressure or increase in gas used occurs in the area of the leak. When access to such a pressurized cable is desired, as when electrical connections are to be made to the cable, it is necessary to form the above-mentioned gas-tight blocks in the cable on both sides of the area where the work is to be performed. These cable blocks are generally formed in situ by introducing a self-curing liquid composition inside of the cable or inside a mold surrounding a portion of the cable from which the sheath has been removed. To assure the penetration of the resin composition into the cable to make sure that it completely blocks the migration of gas through the cable at the area selected it is necessary to open up channels or passageways transverse to the wires to permit the resin to migrate into the interior of the wire bundle.

The opening of channels into the wire bundle has previously been performed by members called channeling pins which are forced into the wire bundle producing on each side of the pin a passageway for the resin along the length of the pin and through the wire bundle and which channeling pins then remain in the wire bundle after the resin block is completed. The pins that have been used previously are formed from rod stock circular in cross-section and have one pointed end. The pins were generally four inches long and ⅛ inch in diameter with a sharpened point formed on one end. This pin when forced through the wire bundle would form passageways but many times the point would penetrate the insulation on one of the wires, would even cut a wire, or the sharp point would catch on a wire and draw part of the wire out of the bundle.

SUMMARY OF THE INVENTION

The present invention provides a much improved member for opening channels through a wire bundle, which channels are adapted to receive resin during the preparation of a gas-tight block.

The member or channeling wedge according to the present invention has a tip of a special shape and is tapered or wedge-like in a plurality of its dimensions so that the wedge can be easily inserted by hand through a wire bundle and will readily slide between the wires without piercing, or cutting the insulation on wires which it contacts to open channels for receiving the resin.

DESCRIPTION OF THE DRAWING

The present invention will be more fully understood after reading the following detailed description which refers to the accompanying drawing wherein.

DESCRIPTION OF THE PREFERRED EMBODIMENT

Figure 1:
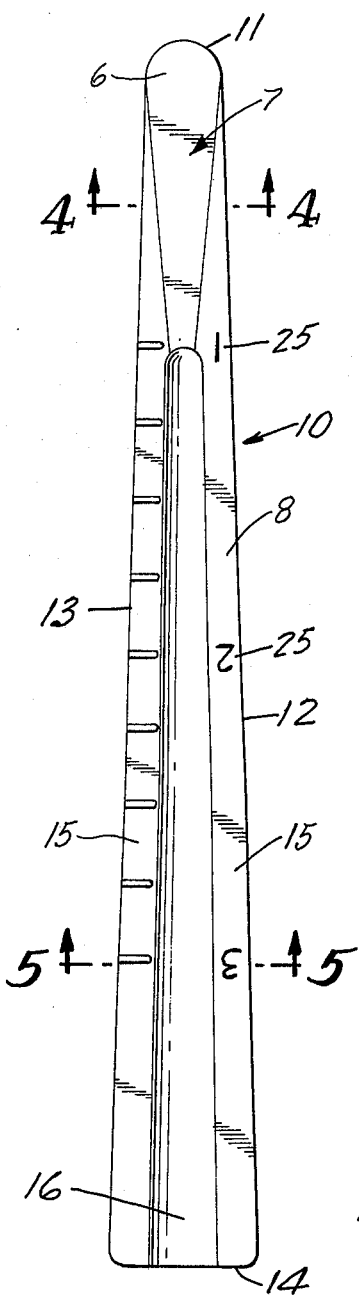
FIG. 1 is an elevational view of the channeling wedge of the present invention.

Referring now to the drawing, there is shown in FIG. 1 a one-piece longitudinal polymeric channeling wedge 10 according to the present invention which may be molded from polycarbonate, polypropylene, polystyrene nylon or polyethylene to have a matte finish.

Figure 2:
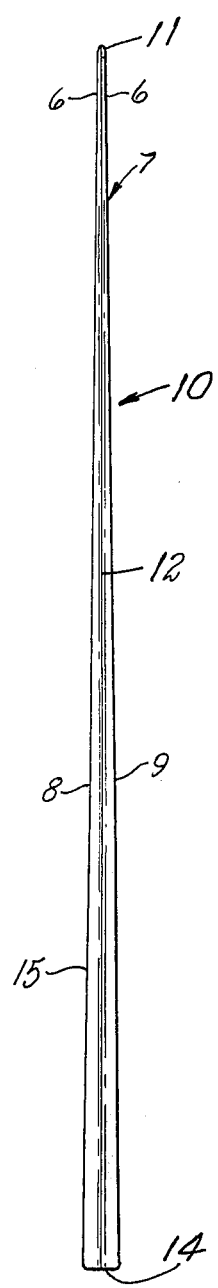
FIG. 2 is a side view thereof.

The channeling wedge 10 has a tip end surface 11 with a substantially greater length than width dimension; a broad end surface 14 opposite its tip end surface 11 adapted to receive force to move the wedge 10, tip end surface first, between the wires of a cable; opposite edge surfaces 12 and 13 having essentially the same width dimension as the tip end surface 11, being aligned with the tip end surface 11, and extending from the tip end surface 11 to the opposite end surface 14; and opposite broad side surfaces 8 and 9 joining the tip end surface 11, the opposite end surface 14, and the edge surfaces 12 and 13. The wedge 10 includes a narrow blade-like tip or end portion 7 terminating at the tip end surface 11. As seen in FIGS. 1 and 2 the end portion 7 is smoothly radiused both between the side surfaces 8 and 9 and between the edge surfaces 12 and 13 of the channeling wedge 10 to define the tip end surface 11. These radii cause deflection of wires from the tip end surface 11 upon movement of the end portion 7 between the wires of a cable. The end portion 7 also has opposite generally planar portions 6 of the side surfaces 8 and 9 which diverge from the tip end surface 11 toward the opposite end surface 14.

Figure 4:
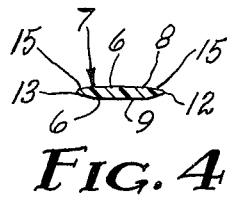
FIG. 4 is a sectional view taken along lines 4—4 of FIG. 1.
Figure 5:
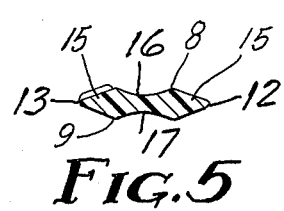
FIG. 5 is a sectional view taken along the lines 5—5 of FIG. 1.
Figure 3:
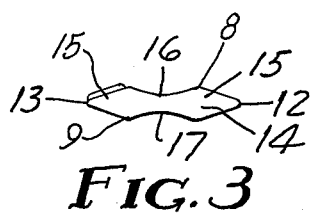
FIG. 3 is an end view thereof.

As best seen in FIGS. 3, 4, and 5, longitudinal outwardly projecting wedge-like edge portions 15 of the wedge 10 define its edge surfaces 12 and 13. Each edge portion 15 also defines opposite portions of the side surfaces 8 and 9 of the wedge that diverge from the associated edge surface 12 or 13 toward a central portion of the wedge 10. The edge portions 15 diverge from each other longitudinally from the tip end surface 11 toward the opposite end surface 14 of the wedge 10. The edge surfaces 12 and 13 and planar portions 6 of the side surfaces 8 and 9, each of which diverge from the tip end surface 11, together with the diverging portions of the side surfaces 8 and 9 on the wedge-like edge portions 15 are adapted to smoothly increase the separation between wires deflected by the tip end surface 11 and to open passageways for resin adjacent the edge surfaces 12 and 13 during movement of the channeling wedge 10 between the wires of a cable.

A groove 16 or 17 is formed in the wedge 10 along each of the side surfaces 8 and 9. The grooves 16 and 17 are opposite each other and extend from the opposite end surface 14 to the end portion 7 such that a cross section of the wedge 10 intersecting the grooves 16 and 17 is generally that of two diamond-shaped members joined at edges (see FIG. 5). The grooves 16 and 17, upon insertion of the channeling wedge 10, provide passageways for the flow of blocking resin between the side surfaces 8 and 9 and the wires into the center of a wire bundle. Smooth sloping grooves (not shown) may also extend transverse to the wedge to facilitate resin flow from the grooves 16 and 17.

When the wedge 10 is adapted for use with cables with up to 1000 pairs of wires, it is preferably about 4 inches long. It can, however, be made longer to permit it to penetrate cables of 3,000 pairs of wires or more. The tip 11 is preferably ¼ inch in width, or between about 0.12 and 0.37 inch, and between 0.015 and 0.045 inch thick with suitable radii at the tip end surface 11. A preferred thickness is 0.030 inch with a radius of 0.015 inch. Typically the end surface 14 is about 0.12 inch thick and about ½ inch wide.

Figure 6:
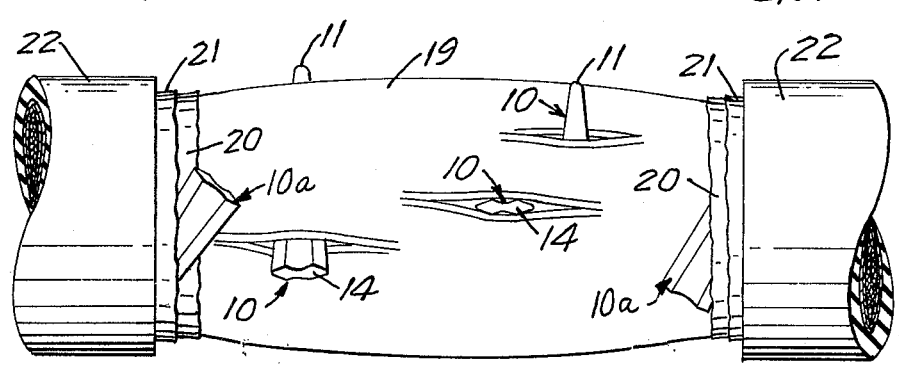
FIG. 6 is a detailed view showing channeling wedges according to the present invention positioned within a cable bundle to form passageways therein.

In FIG. 6 there is shown a multiconductor sheathed cable 18 formed with a plurality (e.g. 300) of small separately insulated wires 19. A sheath 20 formed by a helically wound web of paper holds the wires 19 in a bundle and a shield 21 formed of steel covers the sheath 20. A layer of insulating material 22 usually an elastomeric material) 22 covers the outside of the shield 21. In forming a block in the cable 18 the coating 22, shield 21 and sheath 20 are all severe along a 6 inch length of the cable 18 exposing the bundle of wires 19. The channeling wedges 10 may thus be inserted between the shield 21 and the sheath 20 to allow some resin to penetrate in this area and also a multiplicity of the wedges 10 are forced through the bundle of wires 19 transverse to the path of the wires 19. In FIG. 6, three channeling wedges 10 are illustrated in positions penetrating the bundle of wires 19. In the actual forming of a block approximately ten to fifteen of the channeling wedges 10 are driven through the bundle of wires 19 to open the bundle sufficiently that a self-curing resinous composition may be poured into a mold surrounding this opening in the cable and that the composition will fill the inside of the cable 18. The channeling wedges 10 permit this composition to get into the center of the cable and it is necessary that all the passageways formed between the wires lengthwise of the cable be coated to block the movement of the gas along the wires 19 of the cable 18.

As is shown in FIG. 6, each channeling wedge 10 forms a channel along each of its edge surfaces 12 and 13, permitting the resinous composition to flow into the bundle of wires 19 along the edge surfaces 12 and 13; and the grooves 16 and 17 have sufficient size to permit the resinous composition to flow into the bundle between the wires and the side surfaces 8 and 9 of the wedge 10. Where the end portions or tips 7 11 have fully penetrated the cable 18 it is noted that the wires 19 have not been pulled or stretched from the bundle as the radii on the tip end surfaces 11 permit the movement of the channeling wedges 10 through the bundle and between the wires 19.

The wedge may also be inserted between the wrapping and the wires in bundles, between the sheath and wires, between the sheath and shield, and between the shield and protective armour. When used in this manner the wedge 10 is inserted at an angle to follow a helical path around the wires lifting the wrapping, sheath, shield or armour as is indicated by wedge 10a in FIG. 6. The flexibility of the wedge and the thin blade-like end portion 7 afford entry of the wedge under these members.

The wedge of this invention may also be formed with a large head like that of a nail (not shown) to permit it to be driven easier by hand. Also a pad may be applied to the broad end surface 14 to make the wedge easier to drive.

Suitable liquid compositions for forming the block in the cable are sold under the trademark "SCOTCHCAST" of Minnesota Mining and Manufacturing Company of Saint Paul, Minnesota. These materials may include polyurethanes, and epoxy resins and suitable examples are sold under the catalogue number 4407 and numbers 4, 10, 11, and 14, respectively.

The wedges 10 are provided as illustrated with graduations 25 to afford a measure of the penetration of the wedge 10 into the wire bundle. The graduations 25 are visual indications of inches, centimeters, etc. and raised ribs near the edge surface 13 provide for further calibrations and are readable by touch.

I claim:

1. A channeling wedge for forming passageways to allow the introduction of resin between the wires of a multiwire cable, said channeling wedge comprising a broad longitudinal polymeric member having a tip end surface with a substantially greater length than width dimension; an end surface opposite said tip end surface adapted to receive force to move the wedge, tip end surface first, between the wires of a said cable; opposite edge surfaces having essentially the same width dimension as said tip end surface, being aligned with said tip end surface, and extending from said tip end surface to said opposite end surface; and opposite broad side surfaces joining said tip end surface, said opposite end surface and said edge surfaces, which polymeric member:

includes a narrow blade-like end portion terminating at said tip end surface, said end portion being smoothly radiused both between said side surfaces and between said edge surfaces to define said tip end surface, which radii cause deflection of wires from said tip end surface upon movement of said end portion between the wires of a said cable, and having opposite generally planar portions of said side surfaces which diverge from said tip end surface toward said opposite end surface;

includes longitudinal outwardly projecting wedge-like edge portions which define said edge surfaces and diverge from each other longitudinally from said tip end surface toward said opposite end surface, and which wedge-like edge portions each define opposite portions of said side surfaces that diverge from the associated edge surface toward a central portion of the polymeric member, said edge surfaces and planar side surface portions which diverge from said tip end surface and said diverging portions of said side surfaces on said wedge-like edge portions being adapted to smoothly increase the separation between wires deflected by said tip end surface and to open passageways for the resin adjacent said edge surfaces during movement of said channeling wedge between the wires of a said cable; and has a groove along each of said side surfaces between said wedge-like edge portions extending from said opposite end surface to said end portion, the grooves along said side surfaces, upon insertion of said channeling wedge through a said cable, providing passageways for resin between the side surfaces and said wires.

2. A channeling wedge according to claim 1 wherein said end portion adjacent said tip end surface is between 0.12 and 0.37 inch wide between said edge surfaces, said width dimension of the tip end surface is between 0.015 and 0.045 inch, and said edge surfaces converge over a length of about 4 inches from a portion of said wedge about 0.5 inch between said edge surfaces and about 0.12 inch between said side surfaces.

3. A channeling wedge according to claim 1 wherein at least one of said side surfaces has graduations marked along its length.

\* \* \* \* \*